United States Patent

Hori et al.

[11] Patent Number: 5,678,520
[45] Date of Patent: Oct. 21, 1997

[54] ENGINE CONTROL UNIT FOR AN INTERNAL COMBUSTION ENGINE

[75] Inventors: Toshio Hori; Yoshihiko Akagi; Nobuo Kurihara; Hiroshi Kimura, all of Hitachinaka, Japan

[73] Assignees: Hitachi, Ltd.; Hitachi Car Engineering Co., Ltd., both of Japan

[21] Appl. No.: 603,343

[22] Filed: Feb. 20, 1996

[30] Foreign Application Priority Data

Feb. 20, 1995 [JP] Japan ............... 7-030392

[51] Int. Cl.$^6$ .................................. F02P 5/06
[52] U.S. Cl. .................................. 123/419
[58] Field of Search .................. 123/419, 436, 123/376, 371, 425, 493, 675; 364/431.07, 431.03; 73/116, 117.3

[56] References Cited

U.S. PATENT DOCUMENTS

| | | | |
|---|---|---|---|
| 5,559,705 | 9/1996 | McClish et al. | 364/431.07 |
| 5,587,524 | 12/1996 | Hampo et al. | 73/116 |
| 5,602,331 | 2/1997 | Prevost | 73/116 |
| 5,605,132 | 2/1997 | Hori et al. | 123/419 |

FOREIGN PATENT DOCUMENTS

4-19344  5/1990  Japan.

*Primary Examiner*—Raymond A. Nelli
*Attorney, Agent, or Firm*—Evenson, McKeown, Edwards & Lenahan, P.L.L.C.

[57] ABSTRACT

An engine control unit is configured to detect the revolution of an engine and to obtain the intensity of both the first order component of revolution for every combustion (one cycle per combustion) and the second order component of revolution. The second order is twice as much as the first order component. The unit further obtains dispersion or deviation in these intensities. Thereby, it is possible to detect combustion conditions and to correct them to desirable conditions.

7 Claims, 10 Drawing Sheets

ENGINE CONTROL UNIT FOR AN INTERNAL COMBUSTION ENGINE

BACKGROUND OF THE INVENTION

The present invention relates to an engine control unit for an internal combustion engine, and particularly relates a fuel injected internal combustion engine with a control unit by which combustion conditions are detected and compensated to attain the predetermined conditions.

In the prior art, for example, as shown in Japanese Patent Application Laid-Open No.4-19344, an abnormal combustion condition was detected with the intensity of the predetermined frequency component to analyze the revolution of an engine with frequencies.

The prior art above is useful to detect just one accidental abnormality in combustion but cannot detect the stability in every combustion.

SUMMARY OF THE INVENTION

The foregoing problem is solved by obtaining the intensity of both the first order component of revolution for every combustion (one cycle per combustion) and the second order component of revolution which is twice as much as the first order component for every predetermined time period in the variation of revolution of an engine. The dispersion or the deviation in the multiple intensities of both the first and second order component above during the predetermined period is obtained and used as guidelines for combustion stability in the engine control unit with means to detect the combustion conditions of an engine based on the variation of its revolution and to compensate the combustion conditions.

By detecting engine revolution, the intensities of both the first order revolution component in a cycle per combustion and the second order revolution component which is twice as much as the first order component are obtained, and any dispersion or deviation therein is used as guidelines for combustion stability.

PREFERRED EMBODIMENTS OF THE PRESENT INVENTION

Figure 8:
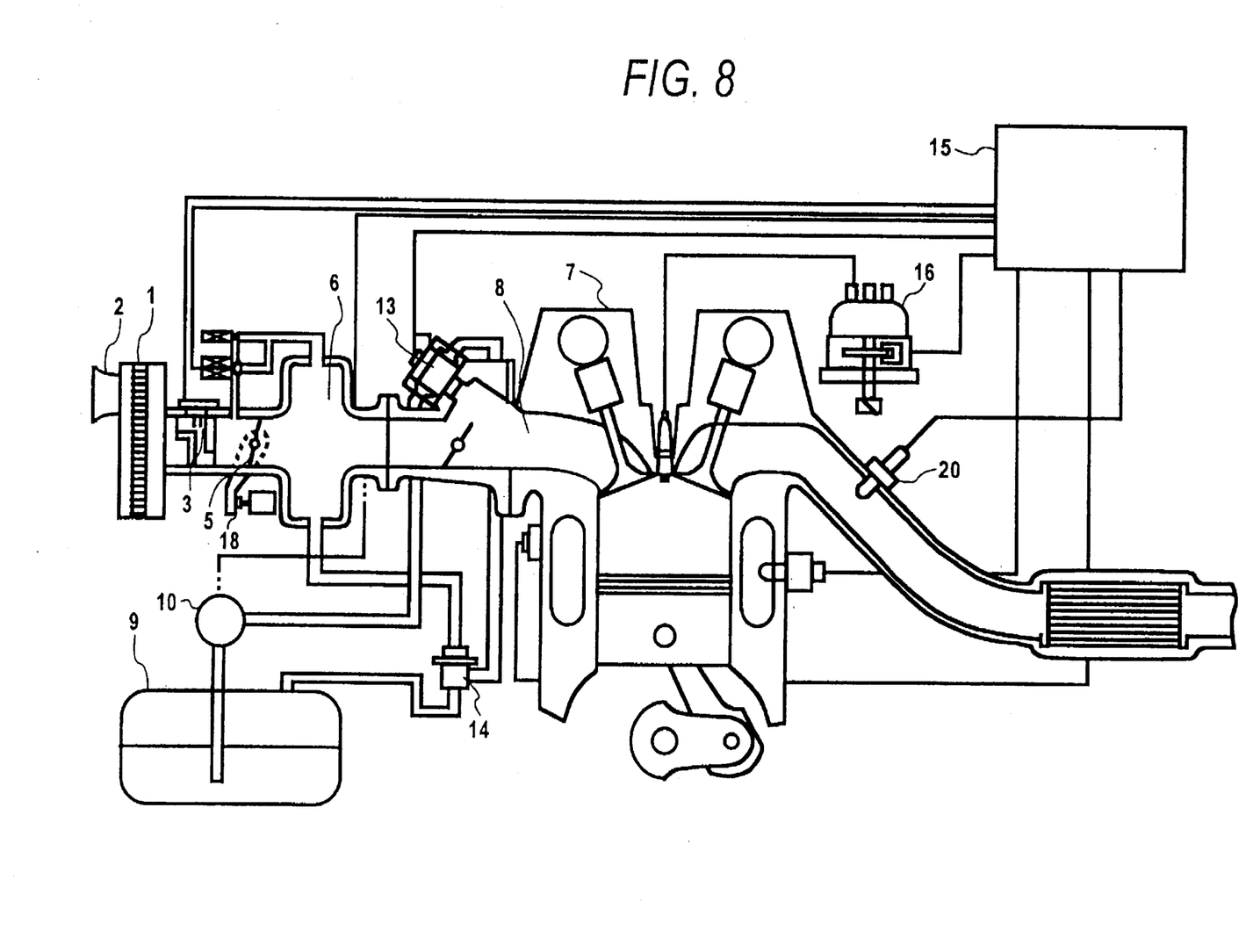
FIG. 8 shows the engine control unit of the present invention in an engine system.

FIG. 8 shows an engine system on which the air to be sucked up by an engine is taken through opening 2 of cleaner 1, flows through throttle valve body 5 which accommodates a throttle valve to control the flow rate of air and flows into collector 6. Then, air is distributed to each inlet pipe 8 connected to each cylinder in an engine 7 and flows into cylinders.

Fuel such as gasoline, etc. is sucked up from a fuel tank 9, pressurized with a fuel pump 10 and supplied to a fuel system in which a fuel injector 13 and a fuel pressure regulator are connected with piping. Then, the fuel is pressurized to a predetermined pressure with a fuel pressure regulator 14 and injected into each inlet pipe 8 through each fuel injection valve 13 provided for each cylinder.

Furthermore, a signal indicative of the flow rate of air is output from an air regulator 3 and inputted into a control unit 15.

Furthermore, a throttle sensor 18 to detect the opening of a throttle valve 5 is mounted on the above throttle valve body 5. The throttle sensor output is also inputted into the control unit 15. Then, a crank angle sensor is built in a distributor 16 which outputs both reference angle signal (REF) to show the position of a crank shaft in its revolution and angle signal (POS) to detect the number of revolutions. These signals are also inputted into the control unit 15.

An A/F sensor provided for an exhaust pipe detects the ratio of air/fuel in actual driving conditions, i.e, either rich or lean, the output signal of which is also inputted into a control unit 15.

Figure 7:
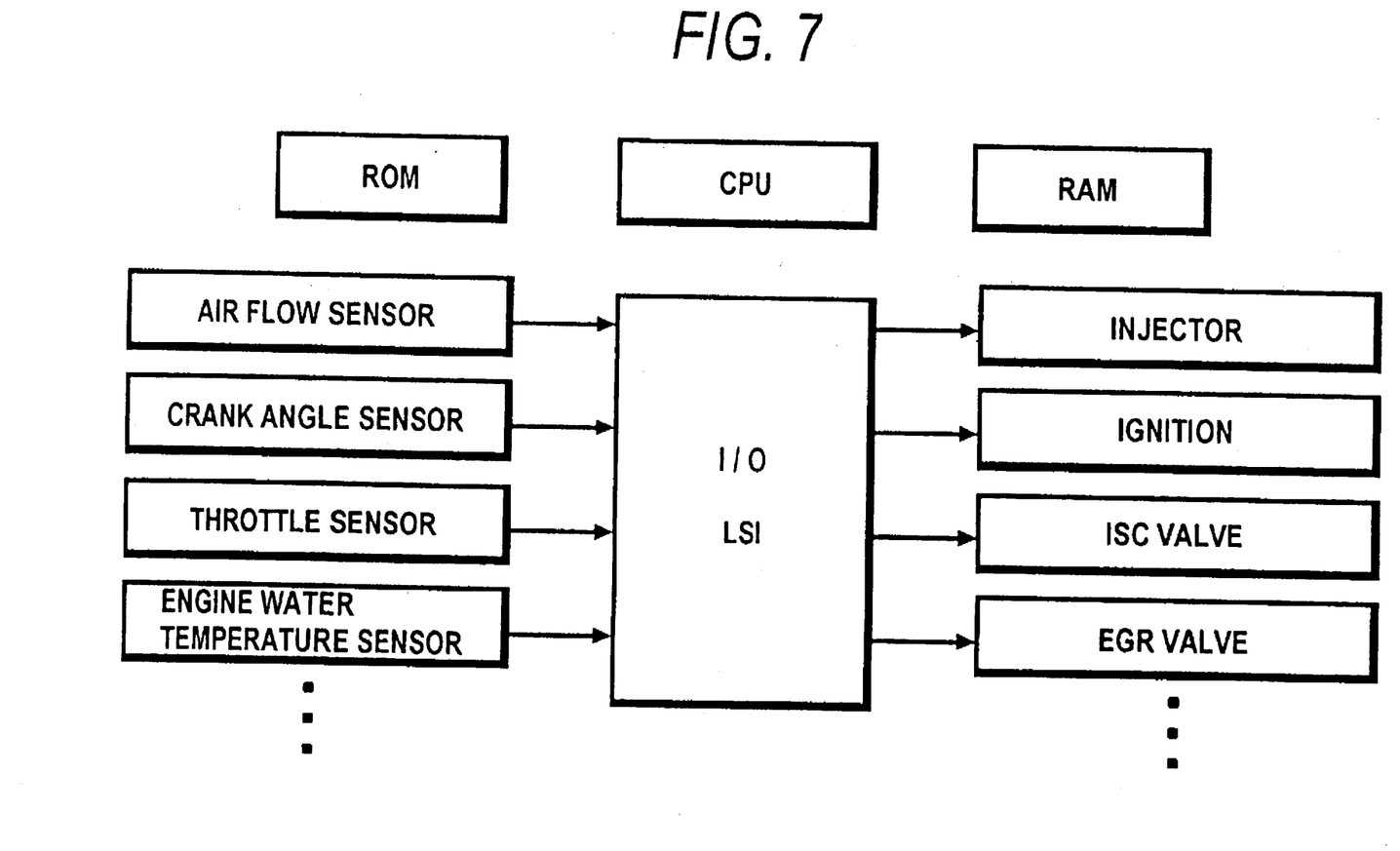
FIG. 7 is a schematic of the engine control used in accordance with the present invention.

The main part of the control unit 15 inputs the signals from various sensors to detect MPU, ROM and the driving conditions of an A/D converter engine as shown in FIG.7, executes the predetermined operation, outputs various control signals calculated as the result of the operation, supplies the predetermined control signals to both fuel injector 13 and distributor 16 and carries out the control of both fuel supply quantity and ignition timing.

Figure 3:
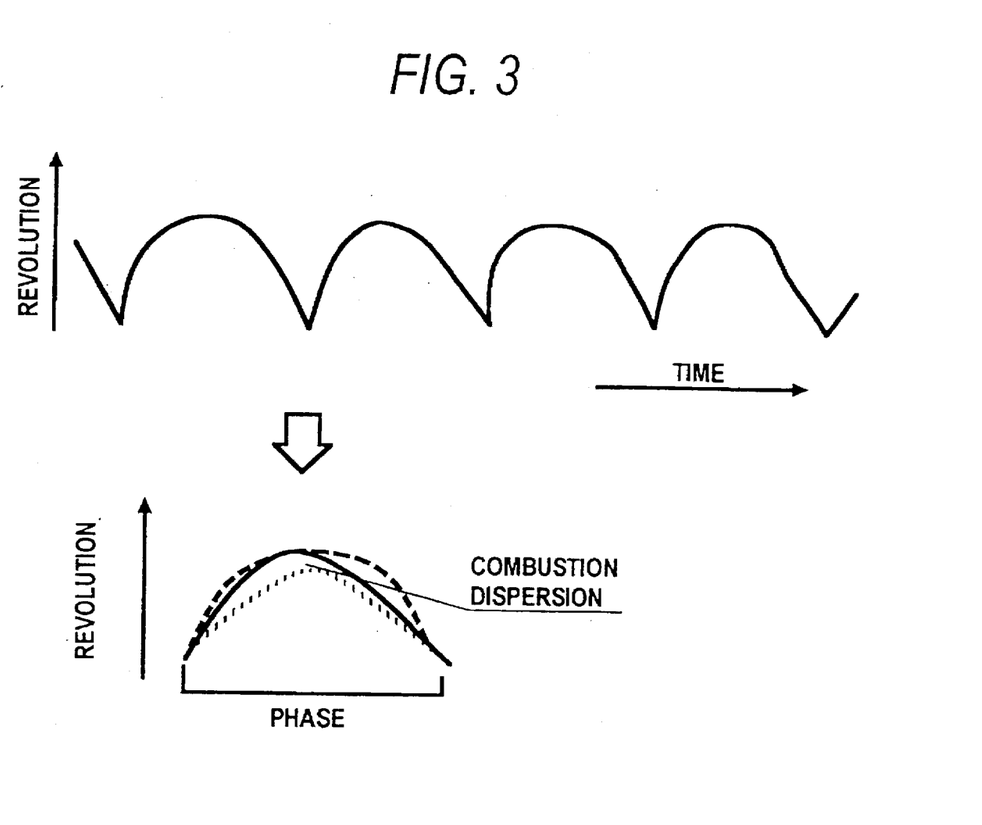
FIG. 3 is a graph illustrating the principle of the present invention.

In the engine as described above, the possibility to detect combustion conditions is advantageous for the achievement of the desirable combustion conditions to be described later. First, if the revolutions of an engine are observed in detail, as shown in the upper part of FIG. 3, the variation of revolution of a convex curve corresponding to each explosion in each cylinder is repeated. That is, because of the output by the combustion in a certain cylinder, a crank shaft receives a positive angular velocity and then, by the compression in another cylinder it soon receives a negative angular velocity per revolution. By balancing among the above positive and negative velocities and other loads received by an engine, its average number of revolutions is decided. Then, since the variation of revolution number is caused by the combustion in an engine, it is possible to detect the dispersion of combustion if various changes of revolution are compared as shown in the lower part of FIG. 3.

Figure 2:
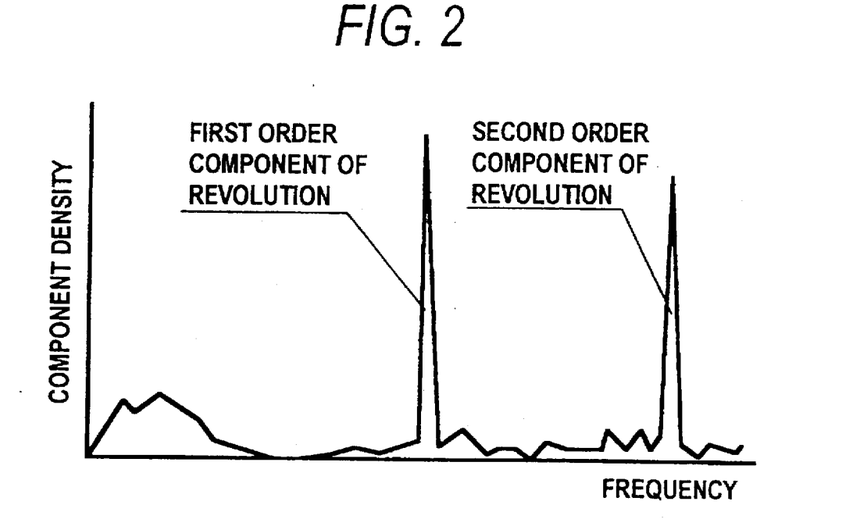
FIG. 2 is a graph showing the characteristics of an engine in terms of component density versus frequency.

Next, the quantitative evaluation method of the dispersion above is described in the following. FIG. 2 shows an example of the analytical results of the revolution behavior shown in FIG. 3 with the number of frequencies. The revolution variation consists of the first order component of revolution and the second order component of revolution which is twice as much as the first order component. Also, there are higher order components of revolution which is have much higher multiples than the first order component above. Among them, the main order components with high intensity are the first and second order components of revolution. Accordingly, it is understood that if the dispersion of the first and second order components of revolution is quantitatively evaluated as a practical matter, the dispersion of combustion can be evaluated.

Figure 1:
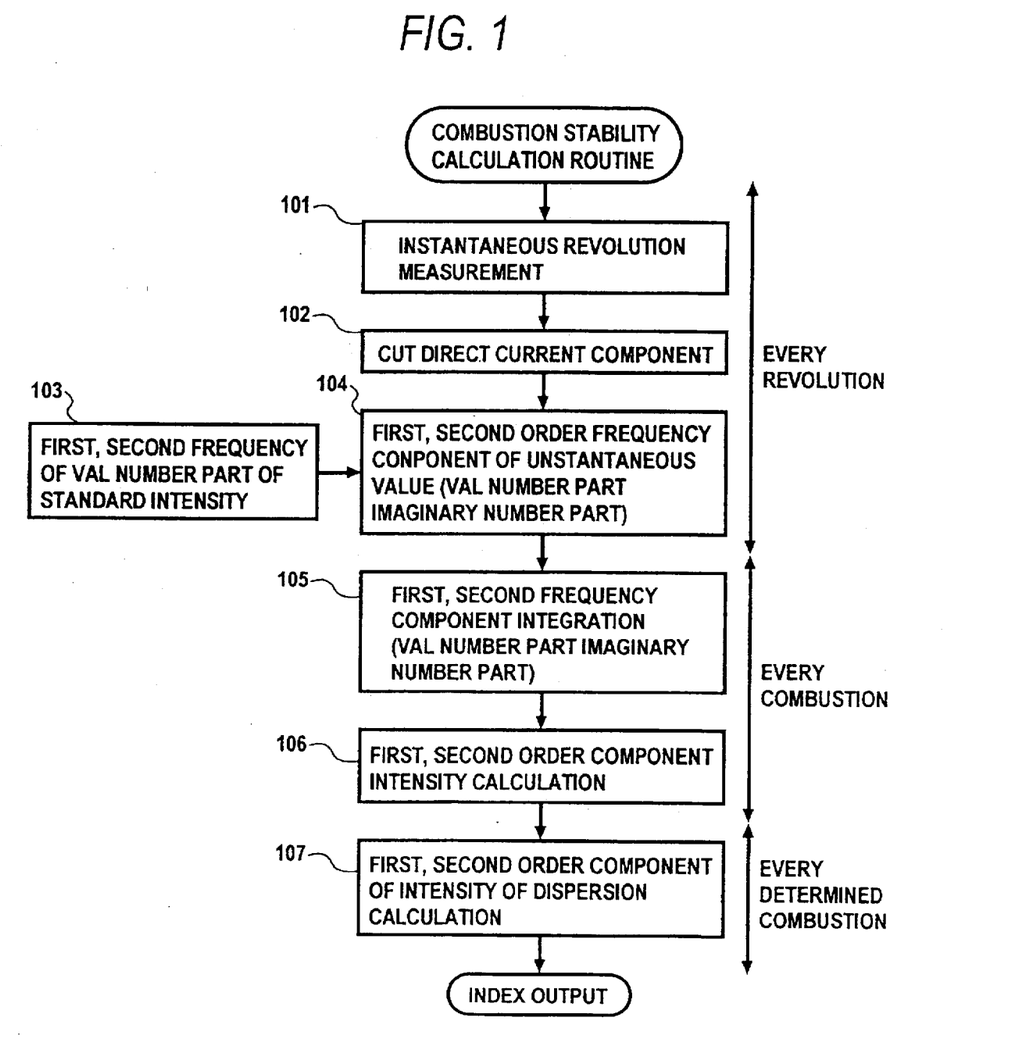
FIG. 1 shows a flow diagram of a process for carrying out one embodiment of the present invention.
Figure 4:
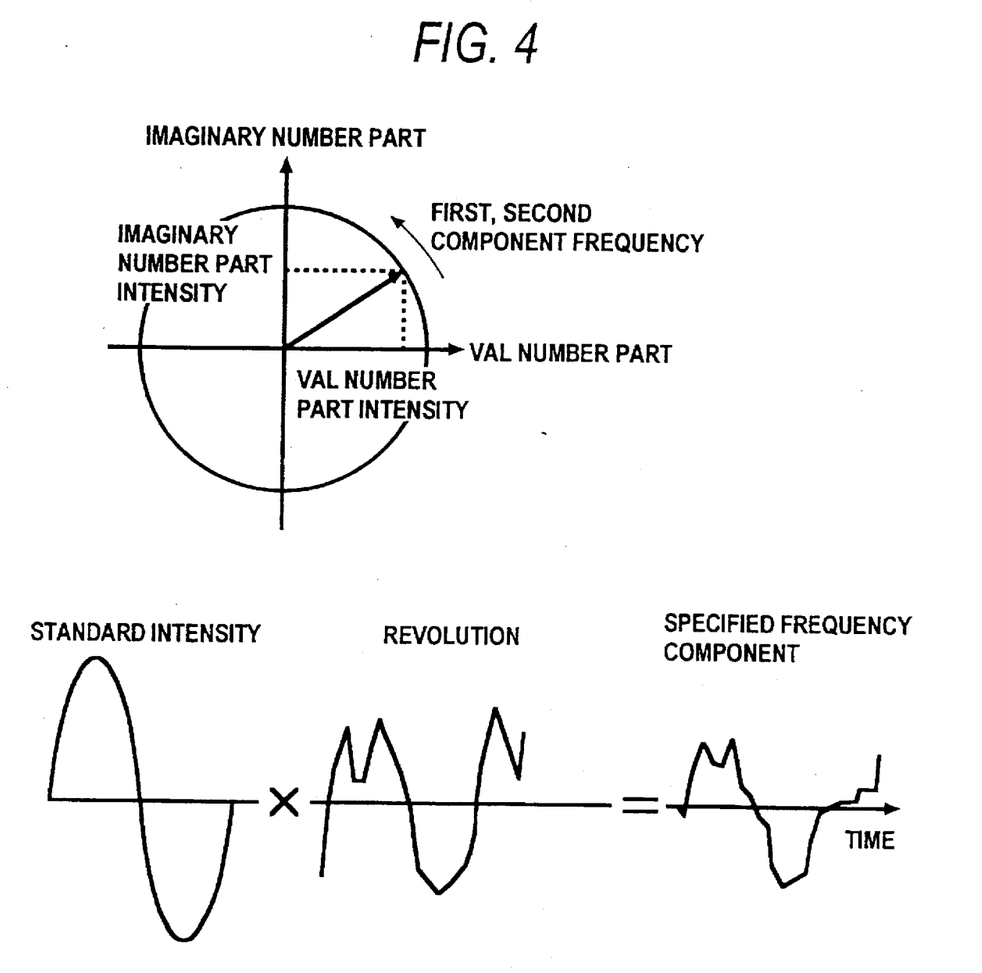
FIG. 4 shows a calculation method of an embodiment in the present invention.

FIG. 1 is a flow chart showing the calculation method. The guideline values for combustion stability are calculated by programming the above calculation method in the control unit 15, based on which various compensations for desirable combustion conditions can be carried out. First, in step 101, the instantaneous revolution of an engine is measured at intervals so as to detect the first and second order components of revolution. As for the timing above, for example, measurement may be carried out for every fine crank angle of an engine. That is, the program is set to calculate in the CPU and also to secure the accuracy in calculation of the first and second order components of revolution. At the very least, the cycle must be less than ½ (a half) of one cycle of the second order component judging from the sampling theorem. Next, in step 102, a direct current component, i.e. the average revolution, shall be eliminated and then the deviation from the average revolution is used for the calculation in the following. Next, in steps 103, 104 and 105, the first and second order components of revolution are taken out of various order components in the revolution variation. In this embodiment, the calculation method in double prime numbers is used in the following. First, the total 4 intensities, i.e. each 2 intensities in both real and imaginary number parts of the first and second order components of revolution which are indicated by a trigonometric function as shown in FIG. 4 are supplied in step 103 corresponding to each phase at the revolution measuring time. By multiplying the above reference intensities by the revolution variation in step 104 as shown in FIG. 4, the total 4 values, i.e. each 2 instantaneous values in both real and imaginary number parts of the specific order components of revolution such as the first and second order components, can be obtained. If these instantaneous values are cumulatively totalled during one combustion in step 105, the intensities in both real and imaginary parts of the first and second order components during one combustion can be obtained. Accordingly, the vibration amplitudes, i.e. the intensities of the first and second order components can be obtained by the average of the square of each value in both real and imaginary parts in step 107. If the dispersion or deviation of vibration amplitudes is obtained from the data acquired by repeating the above in the combustion of sufficient times to make a statistical calculation in step 107, the dispersion or deviation of combustion can be quantitatively determined.

If the above theory is used, an actual programming technique may be implemented to save calculation memories and to shorten calculation time. For example, if the calculation of a trigonometric function is impractical or the CPU required would be too complicated, the output of a trigonometric function may be input into a memory as a table. In that case the calculation of a square root such as the calculation of the average of the square of each value and deviation, etc. is complicated, an intensity value may be handled as a square number and the degree of dispersion may be evaluated as a variance. In this case, the procedure may be carried out after understanding that the guideline which is the output value is nonlinear. Furthermore, the calculation of respective first and second order revolution components may independently be carried out only up to the calculation of intensity in one combustion cycle and the statistical calculation of each order revolution component may be carried out separately from that of the other order component. Two guidelines of combustion stability may be output or, alternatively, by summing up both guideline values as two variables, one guideline may be output.

Furthermore, unlike the calculation with the CPU the same effect can be achieved by obtaining the desired intensity of the first and second order components as well by using the electric circuit to output the specific order revolution component even if the results obtained are statistically calculated.

The method to achieve the desirable combustion conditions with the guideline for combustion stability obtained by the above calculation is described in the following.

Figure 6:
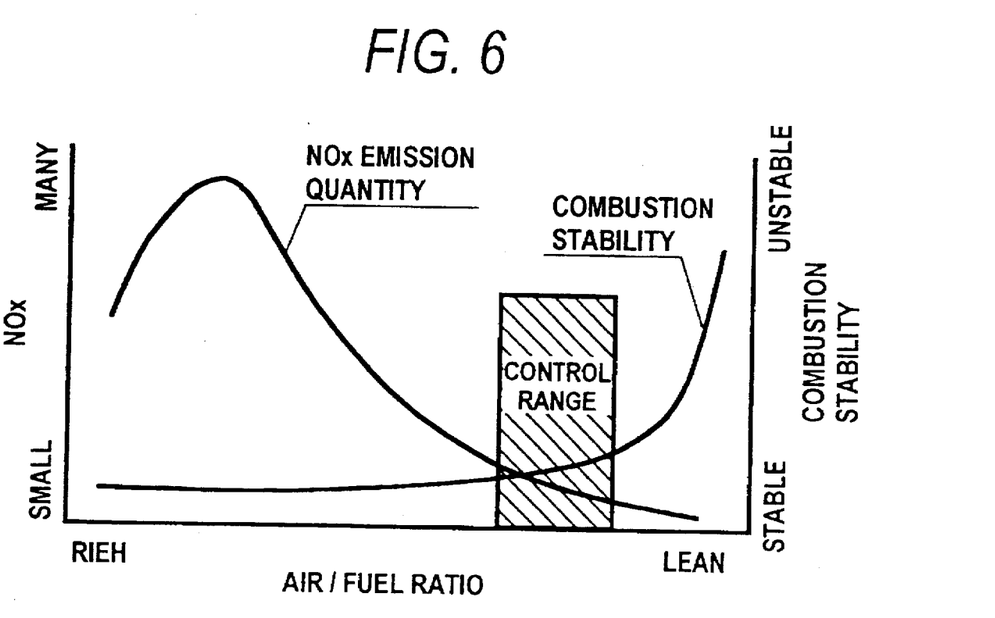
FIG. 6 is another graph showing the characteristics of an engine in terms of NOx emissions versus air/fuel ratio.

FIG. 6 shows the characteristics of combustion in general engines, when the air/fuel ratio is set leaner than the theoretical value. If air/fuel ratio is set leaner by keeping both torque and engine revolution constant, an amount of air to be taken in increases to cause the decrease of a pumping loss and the increase of the specific heat ratio. Accordingly, the fuel consumption is improved. NOx emission quantity also decreases due to the drop of a combustion temperature caused by the lean air/fuel ratio. Since the ignitability due to the lean air/fuel ratio, the combustion stability which can quantitatively be controlled by the torque variation slowly becomes unstable up to a certain air/fuel ratio, and beyond this ratio it suddenly becomes unstable due to the extreme decrease of ignitability. Both combustion stability and NOx emission quantity largely depend on the ratio of air/fuel in its lean zone.

Furthermore, there is a critical quantity for NOx exhaust allowed by governmental emission standards and is another critical point for combustion stability required for driving a car. Therefore, when driving in the lean air/fuel range, the above two critical points must not be exceeded. Moreover, since both combustion stability and NOx emission quantity largely depend on ignition timing, it also must be optimized.

Likewise, instead of lean air/fuel ratio, the increase of EGR rate improves the cost of fuel for the same reason as discussed above. Because NOx emission decreases, the engine should be controlled within the desirable EGR rate range.

However, the accurate control of either the air/fuel ratio to be supplied to an engine or the EGR rate is difficult due to the variation of each quantity in a fuel injector valve 13, an air regulator 3 and an EGR rate control actuator as well as deterioration, etc. so that closed loop controls are required. As one of the ways of implementing closed loop controls, the combustion stability guideline obtained above can be used.

Figure 10:
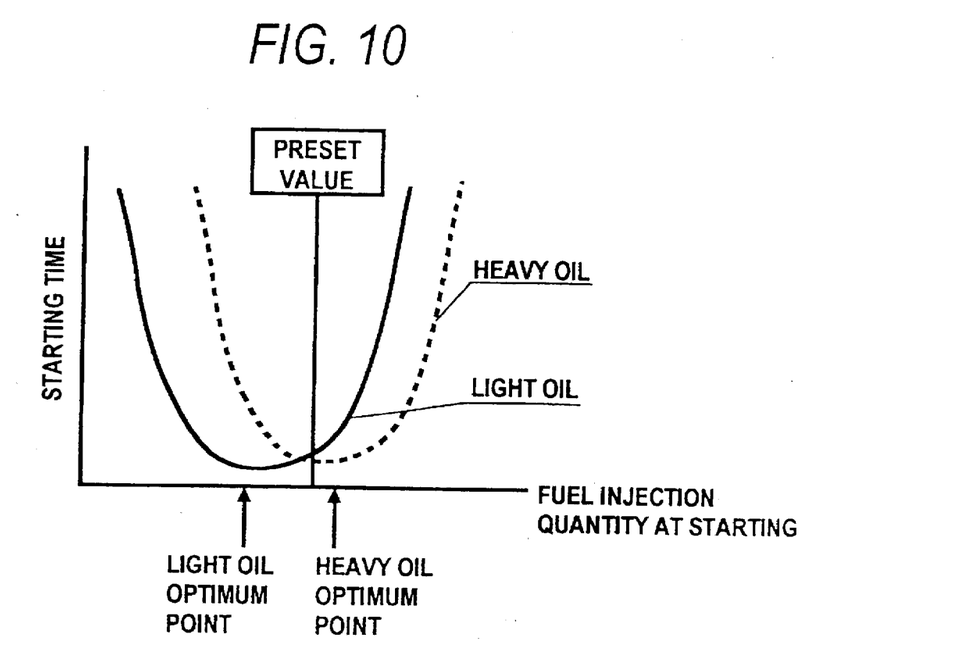
FIG. 10 is a graph comparing the effect of using light oil and heavy oil in relation to starting time as a function of fuel injection quantity.
Figure 11:
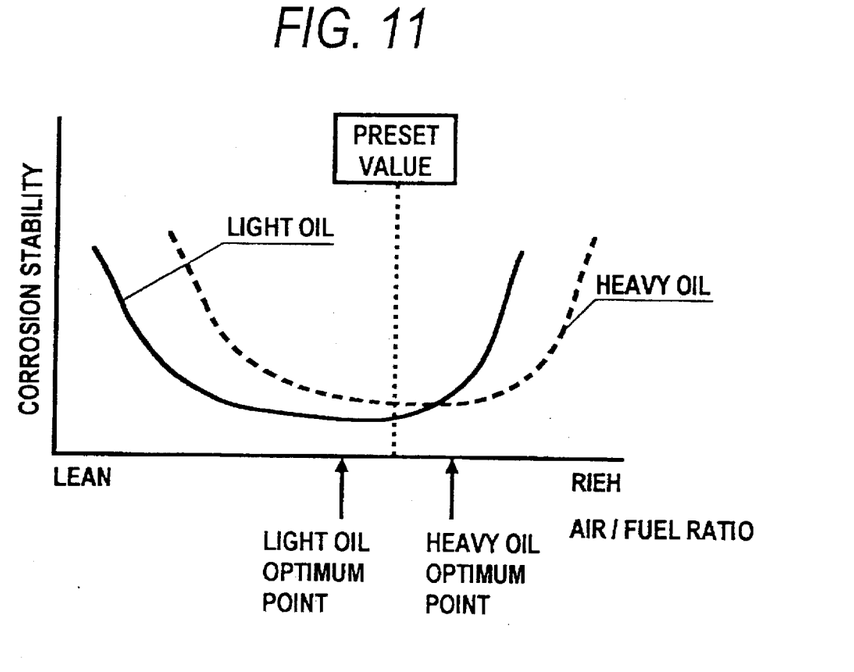
FIG. 11 is a graph similar to FIG. 10 but comparing light and heavy engine oils in relation to combustion stability as a function of air/fuel ratio.

Furthermore, the property of fuel largely affects combustion stability mainly in the conditions before the completion of warming up of an engine. For example, as shown in FIG. 10, when starting up an engine in the cold conditions, the volatile fuel such as light oil reduces fuel injection quantity and makes the starting time shorter than the less-volatile fuel like heavy oil. In the event that the property of mixed fuel can not be checked, an amount of fuel injection quantity required for starting an engine must be decided based on a point of compromise among mixed types of fuel. Even after starting an engine, as shown in FIG. 11, while an engine is in cold conditions, the volatile fuel like light oil can keep combustion stability in the leaner air/fuel ratio than the less-volatile fuel like heavy oil. In this case, also, when the property of mixed fuel can not be checked, an amount of fuel injection quantity required for starting an engine must be decided based on a point of compromise among mixed types of fuel.

Therefore, if the property of fuel is judged by using the guideline for combustion stability obtained above, both fuel injection quantity at starting an engine and the air/fuel ratio in the cold conditions can be optimized.

Figure 5:
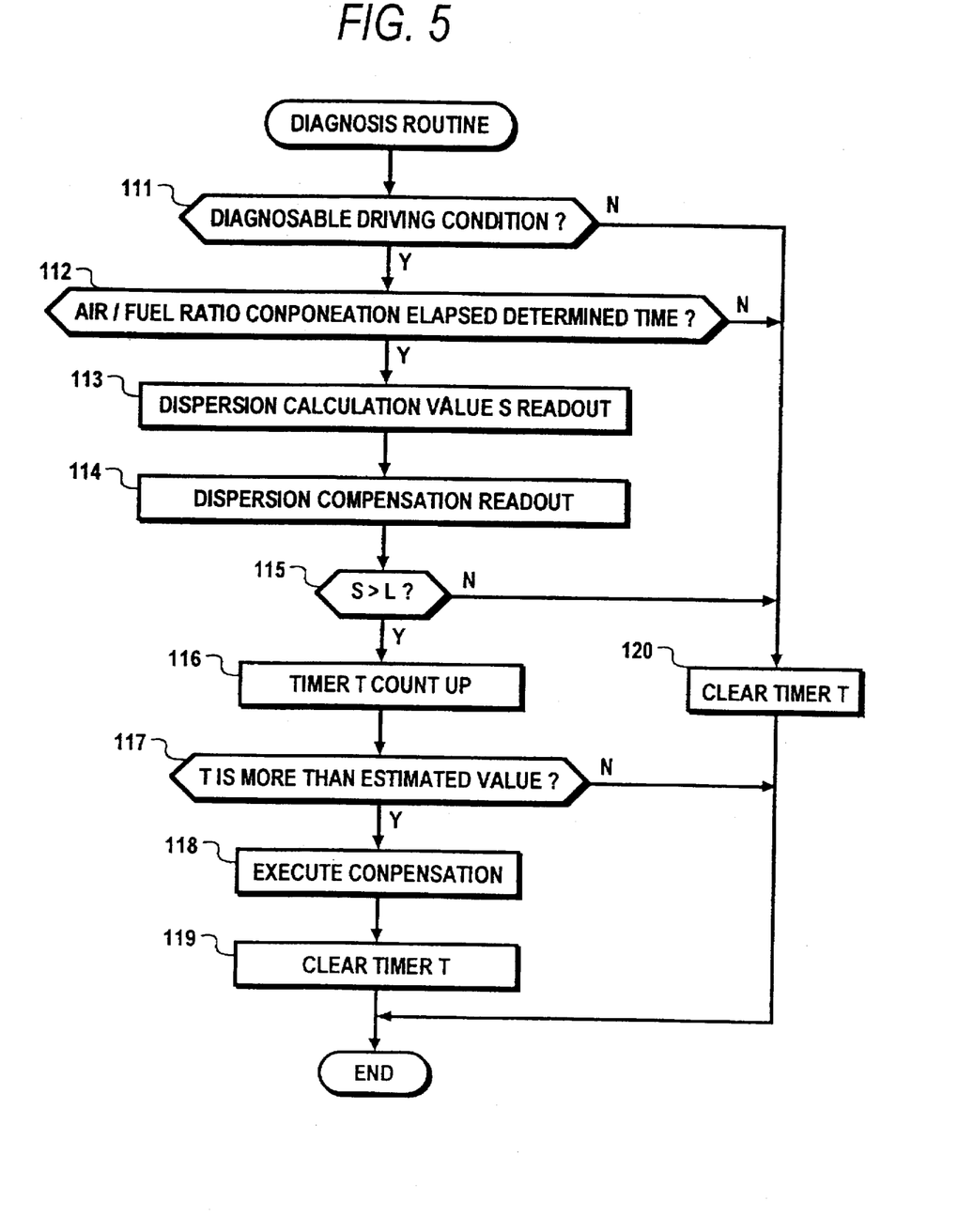
FIG. 5 shows an embodiment in the present invention.

FIG. 5 shows the general procedures of executing the compensation for combustion described above. First, in step 111, it is determined whether or not the guideline conditions for combustion stability are dependable. For example, when the variation of driving conditions of an engine is too great, when the detection of revolution is not accurately carried out, when sufficient data for a denominator is not obtained to make a statistical calculation and so on, a diagnosis is not performed judging that diagnosable driving conditions are not 13 obtained. Next, in step 112, since the guideline for combustion stability is considered to include the conditions prior to the compensation if it is within the predetermined time after executing the compensation of combustion such as the ratio of air/fuel, etc., a diagnosis is also not performed. Then, in step 113, dispersion calculation value S is read out and furthermore, in step 114, dispersion compensation value L is read out to be compared with dispersion calculation value S depending on the driving conditions at that time. Then, in step 115, S or L is judged to be larger and is compared. If S is larger, judging that the compensation for combustion is required, the process proceeds to step 116 where the continuous time of the judgement is counted with a timer T. When it is judged that the compensation for combustion is continuously required, that is, timer T indicates the time longer than the predetermined time in step 117, judging that the compensation for combustion is certainly required, the method proceeds to step 118 in which the actual compensation for combustion is carried out and then, in step 119 the compensation is completed by clearing timer T. The above diagnosis routine is carried out at predetermined intervals. The compensation for combustion substantially increases the ratio of air/fuel in case of lean driving, to decrease ERG 14 rate in case of ERG rate control and the judgement of fuel type, i.e. light or heavy oil in case of the judgement of fuel property.

In the description above, execution of the compensation for combustion stability was shown. However, at the same time as the above, it is also possible to direct the control of combustion stability toward instability by judging that dispersion calculation value S is less than predetermined value.

Figure 9:
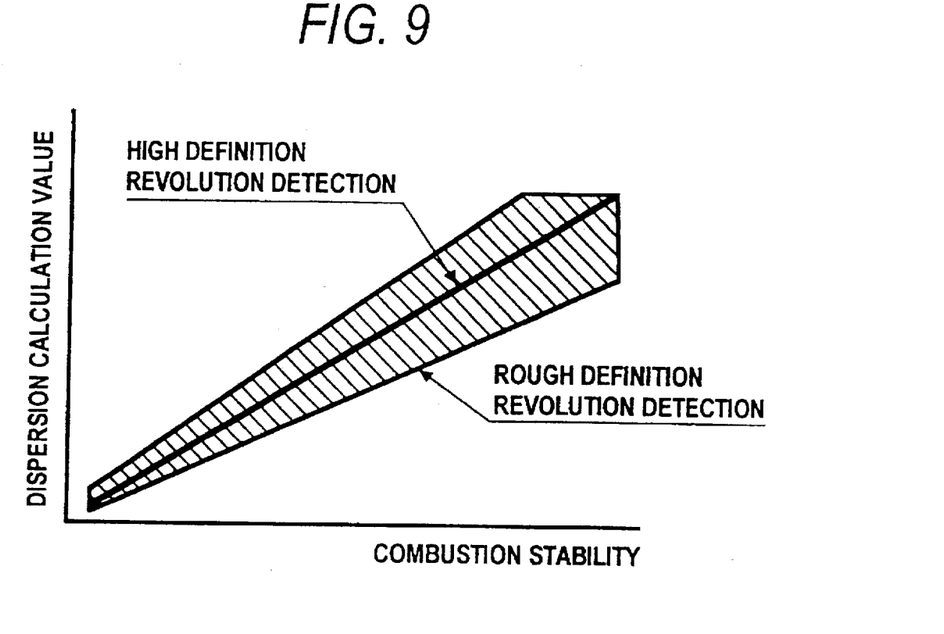
FIG. 9 is a graph of the characteristics of an embodiment in the present invention in which combustion stability is plotted in relation to the dispersion calculation value.

Then, the measurement accuracy of dispersion calculation value S for combustion stability depends on the accuracy of both calculation and measurement of fine revolution, i.e. input. As shown in FIG. 9, when the revolution detection accuracy is high, a close relation is shown between combustion stability and dispersion calculation value with rough revolution detection, the dispersion calculation value shows the errors in combustion stability shown with slanting lines. Accordingly, corresponding to the measurement accuracy of combustion stability, the dispersion calculation value L is set higher in FIG. 5 to avoid misjudgement, the judgement time is also set longer in timer T, etc.

Figure 12:
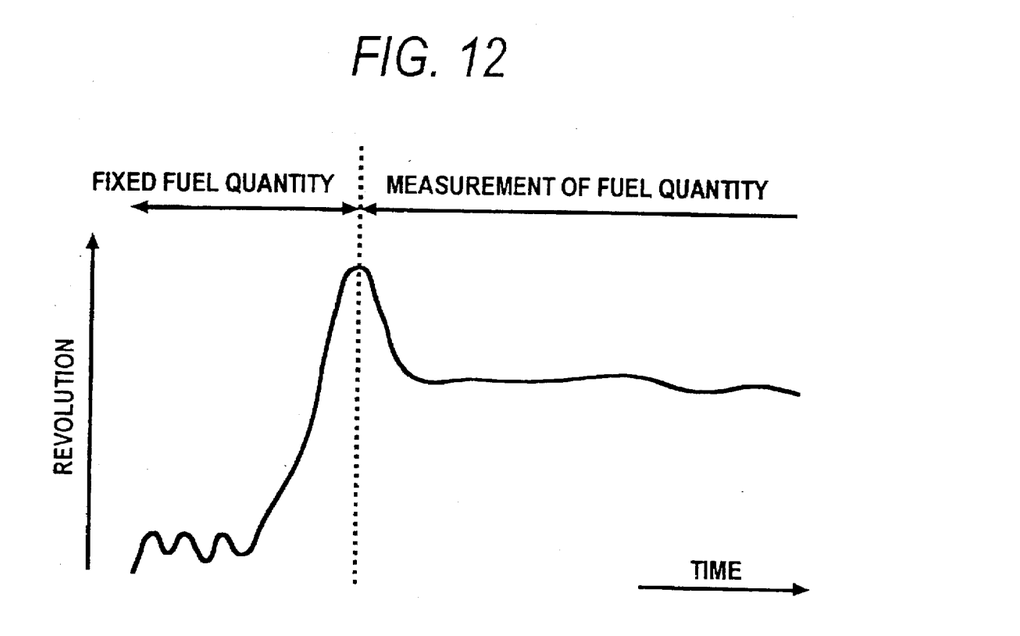
FIG. 12 is a characteristics graph of an engine showing control factors used at the time of engine start-up or starting.
Figure 13:
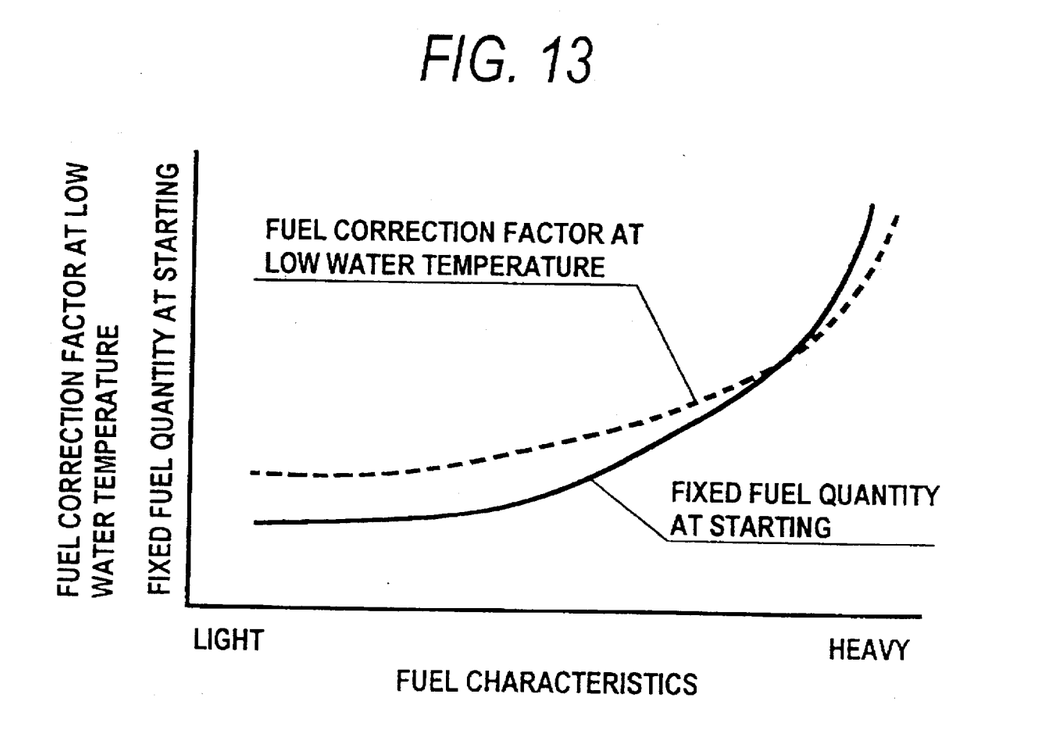
FIG. 13 is a graph showing the relationship between fuel characteristics and low water temperature fuel correction factor and starting fixed fuel quantity.

Now, if the judgement of fuel property is described in detail, as shown in FIG. 11, because it is possible to judge the property of fuel by measuring the combustion stability at the predetermined ratio of air/fuel in cold conditions, the rate of heavy oil in fuel can quantitatively be obtained with dispersion calculation value S at the reference air/fuel ratio. Furthermore, in case that any disturbance largely affects on the detection accuracy of fuel property, not to judge fuel by just one measurement but there is the method to increase the rate of heavy oil by the predetermined value in every measurement and to slowly approach the real value. Based on the fuel property quantitatively obtained in such way, both fuel correction factor at a low water temperature and fixed fuel quantity at starting an engine may be decided as shown in FIG. 13. These control factors, as shown in FIG. 12, are used at the time of starting an engine. That is, the fixed fuel quantity is mainly used from the start of cranking to about the complete combustion and from hence the fuel quantity is decided by the measurement of air to be taken in. Accordingly, the fuel property obtained after the start of an engine can not directly be used for compensating the fixed fuel quantity at starting an engine. Therefore, the fuel property detected during the driving of an engine is stored in the memory which is never lost at the time of stopping the engine and based on which it is useful to compensate fuel quantity at the next engine start-up. Moreover, if the above mechanism can not be set, a simple method such as measuring the temperature of cooling water at the time of starting an engine is used, and if the cooling water temperature is higher than the predetermined temperature, judging that the engine stops for a short time because of refueling and restarts and clearing the fuel property value, the judgement of fuel property may be repeated from the initial conditions again.

In the above description, regardless of number of cylinders in an engine, the embodiment of evaluating the average combustion conditions of all cylinders was shown. However, if the variation of angular velocity of revolution in the combustion process in respective cylinders is independently analyzed, the combustion conditions in each cylinder can be obtained so that the independent compensation for each cylinder can be carried out.

By the present invention, it is possible to detect the combustion conditions in an engine and to correct them to desirable conditions.

What is claimed is:

1. An engine control unit, comprising means for obtaining intensity of a first order component of revolution for each combustion and a second order component of revolution which is twice as much as the first order component for every predetermined time period in a variation of revolution of an engine, means for obtaining deviation in multiple intensities of the first and second order components during the predetermined time period, and means for using the deviation and for detecting combustion conditions of the engine based on the variation of revolution, and means for compensating the combustion conditions.

2. An engine control unit according to claim 1, wherein the deviation-obtaining means obtains the the deviation in the total of intensities of both the first and second order components of revolution.

3. An engine control unit according to claim 1, wherein the deviation-obtaining means independently obtains the deviation.

4. An engine control unit according to claim 1, further comprising means for compensating at least one of air/fuel ratio supplied to the engine, EGR rate, fuel injection quantity at starting, fuel increase at low water temperature and ignition timing based on the deviation value.

5. An engine control unit according to claim 4, further comprising means for storing compensation quantity for the fuel supplied at engine start-up, including at engine shut-down.

6. An engine control unit according to claim 5, further comprises means for detecting operation of a fuel feeder during the engine shut-down, means for detecting an increase of residual fuel from the predetermined quantity before and after the engine shut-down, means for detecting water temperature at least equal to the predetermined value at the engine start-up, and means for removing the compensation quantity from storage when at least one of the detected conditions occurs.

7. An engine control unit according to claim 1, wherein the deviation-obtaining means is provided for each cylinder of the engine.

* * * * *